Aug. 14, 1962         H. M. GEYER         3,049,359

REAR WHEEL SUSPENSION SYSTEM FOR VEHICLES

Filed May 9, 1960         2 Sheets-Sheet 1

INVENTOR.
Howard M. Geyer
BY

*W. E. Finken*
His Attorney

INVENTOR.
Howard M. Geyer
BY
W. E. Finken
His Attorney

3,049,359
REAR WHEEL SUSPENSION SYSTEM FOR VEHICLES

Howard M. Geyer, Dayton, Ohio, assignor to General Motors Corporation, Detroit, Mich., a corporation of Delaware
Filed May 9, 1960, Ser. No. 27,932
12 Claims. (Cl. 280—124)

This invention pertains to vehicle suspension systems, and particularly to an improved rear wheel suspension system for vehicles having the motor in the front and a baggage compartment in the rear.

At the present time some motor vehicles embody a coil spring rear suspension system. In vehicles of this type the height between the frame and the axle varies in accordance with the weight of the load in the baggage compartment, or trunk, of the vehicle. In other words, if the vehicle's baggage compartment is heavily loaded, the height between the frame and the axle will be appreciably less than it will be when the vehicle baggage compartment is unloaded. The present invention relates to means for maintaining a substantially constant height between the frame and the axle in a coil spring rear suspension system within normal load limits. Accordingly, among my objects are the provision of an improved coil spring rear suspension system for maintaining a substantially constant height between the sprung and unsprung masses of the vehicle; the further provision of a coil spring suspension system of the aforesaid type including leveling means for maintaining a substantially constant height between the sprung and unsprung masses of the vehicle; and the still further provision of a spring assembly for vehicles comprising coaxially mounted compression and tension springs.

The aforementioned and other objects are accomplished in the present invention by embodying means for varying the load of the tension spring so as to control the height between the sprung and unsprung masses of the vehicle. Specifically, the rear suspension system includes a coil spring assembly for each rear wheel, each coil spring assembly comprising an outer compression spring and an inner tension spring disposed coaxially of the compression spring. The upper ends of the tension and compression springs engage a spring seat attached to the vehicle frame. The lower end of the compression spring engages a spring seat attached to a lower control arm, one end of which is pivoted to the frame, and the other end of which is pivoted to the rear axle. The lower end of the tension spring is attached to a nut which threadedly engages an Acme screw whereby the load of the tension spring can be varied.

Each Acme screw is drivingly connected with a worm gear that meshes with a worm. The worms are drivingly connected to opposite ends of a flexible drive shaft which can be rotated in either direction by a reversible electric motor that is mounted on the differential housing of the rear axle. Energization of the motor is controlled by a pair of leveling switches suspended from the vehicle frame. An actuator for the leveling switches is attached to the axle whereby the motor will be energized to decrease the load on the tension springs when the height between the frame and axle decreases below the preselected height, and will be energized to increase the load on the tension spring when the height between the frame and the axle increases above the preselected height.

The compression springs and the tension springs have constant spring rates. However, the loads on the springs are in opposite directions. The tension spring is initially preloaded to obtain the desired height between the frame and the axle. As the vehicle is loaded the load on the tension spring is decreased to maintain the preselected height between the frame and the axle. Conversely, when the load is removed from the vehicle, the load on the tension spring is increased to maintain the preselected height between the frame and the axle. When the vehicle is loaded with its maximum designed load the tension spring is unloaded.

Further objects and advantages of the present invention will be apparent from the following description, reference being had to the accompanying drawings, wherein a preferred embodiment of the present invention is clearly shown.

Figure 1:
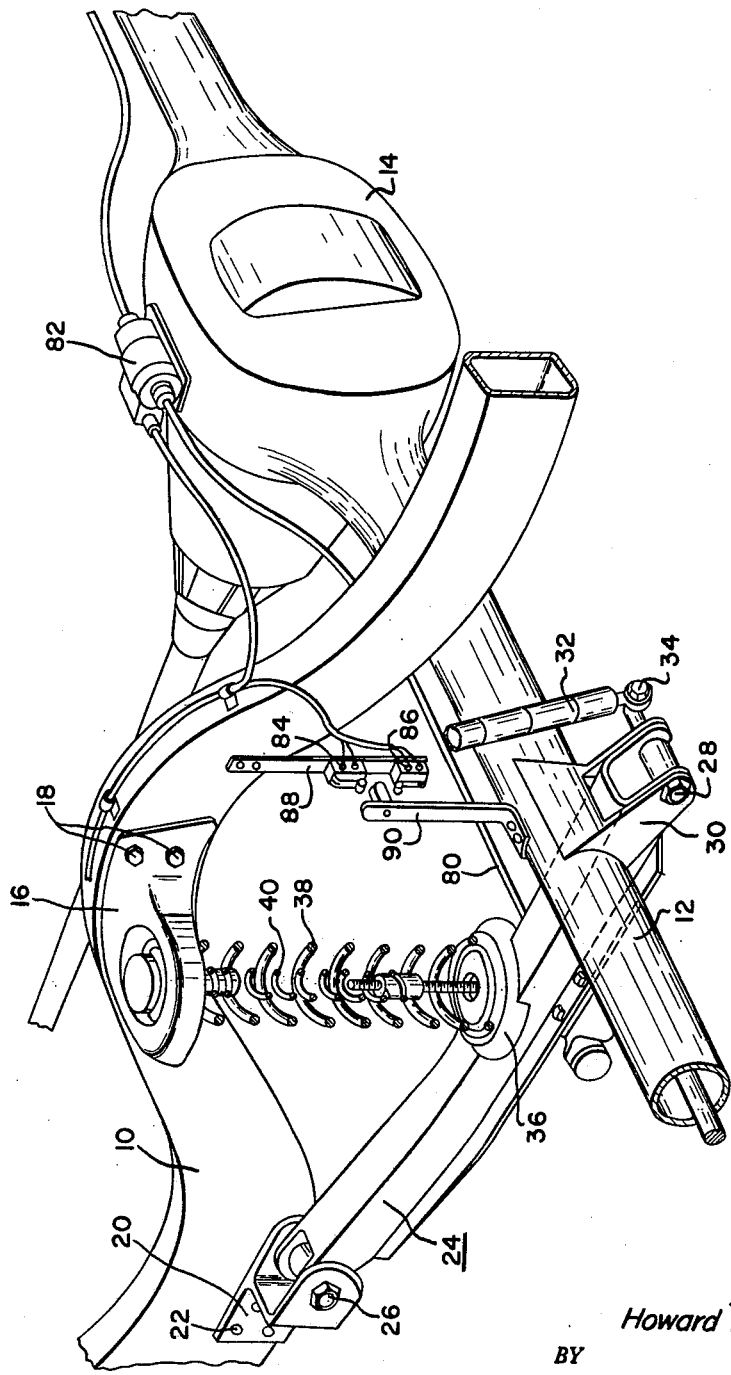
FIGURE 1 is a fragmentary perspective view, partly in section and partly in elevation, with certain parts removed, of a conventional rear suspension system with the height control means of this invention.

With particular reference to FIGURE 1, the rear portion of a vehicle chassis is shown including a frame 10 and a rear axle 12 having a differential housing 14. The frame 10 and the vehicle body attached thereto, not shown, comprise the sprung mass of the vehicle, and the axle 12 and wheels attached thereto comprise a part of the unsprung mass of the vehicle. Moreover, while only one side of the rear suspension is depicted in FIGURE 1, it is to be understood that the other side is a duplicate thereof.

The frame 10 has an upper spring seat 16 attached thereto by means of bolts 18. The frame 10 also has a bracket 20 attached thereto by means of bolts 22. The inner end of a lower control arm 24 is pivotally connected at 26 to the bracket 20. The outer end of a lower control arm 24 is pivotally connected at 28 to a bracket 30 suitably attached to the rear axle 12. The lower end of a conventional shock absorber 32 is connected to the bracket 30 by means of a bolt 34. The upper end of the shock absorber, not shown, is suitably attached to the frame 10. A lower spring seat 36 is suitably attached to the control arm 24 intermediate its ends. A coil spring assembly comprising an outer compression spring 38 and an inner coaxially arranged tension spring 40 is disposed between the upper and lower spring seats 16 and 36, respectively.

Figure 2:
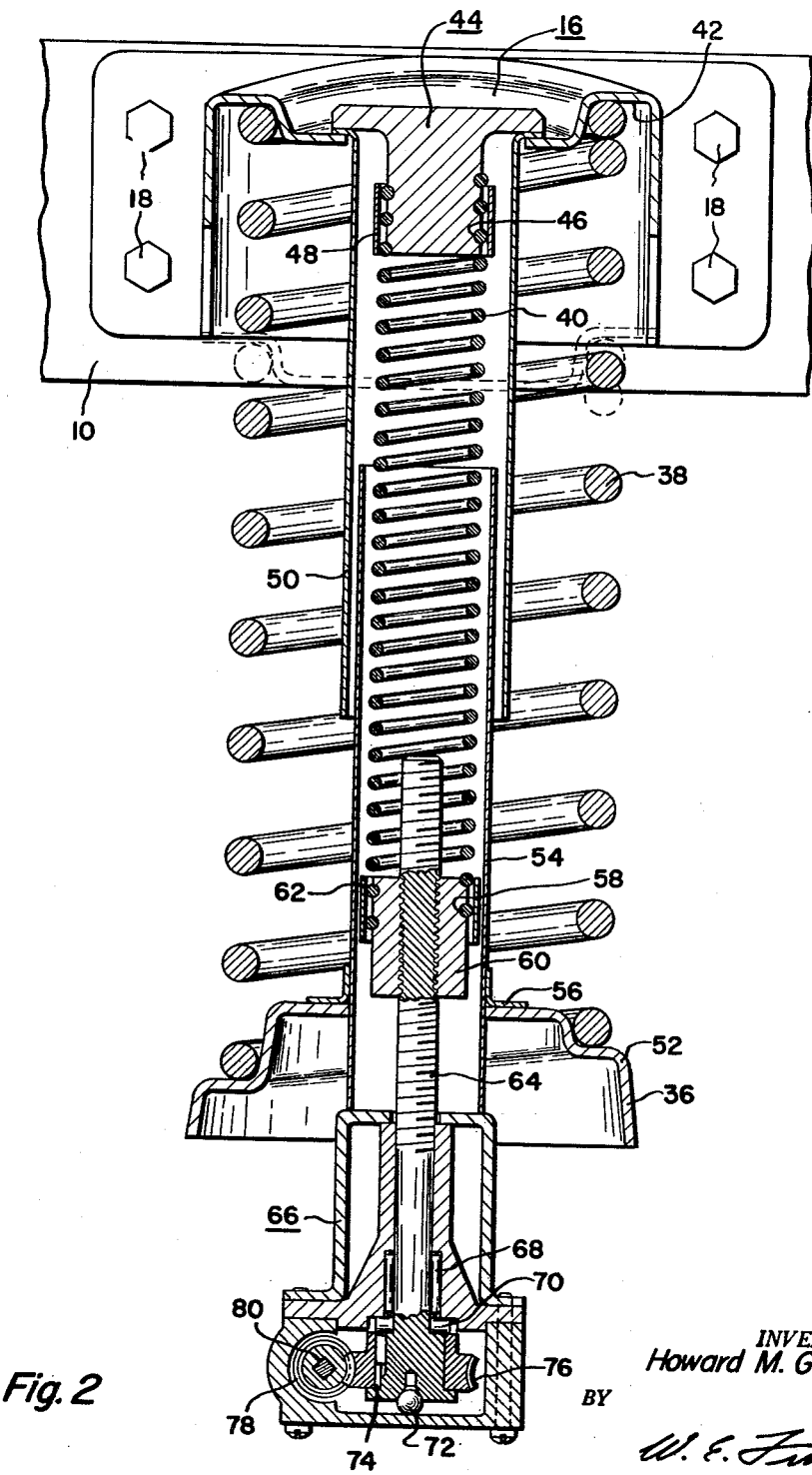
FIGURE 2 is an enlarged sectional view of the combined compression and tension spring assembly.

With particular reference to FIGURE 2, the upper spring seat 16 comprises an inverted cup-shaped metal member having an annular groove 42 for receiving the upper end of the compression spring 38. A retainer 44 is attached to the spring seat 16 and extends through a central aperture thereof. The retainer 44 has a helical groove 46 therein on which the upper end of the tension spring 40 is threaded. A clamp ring 48 is secured about the upper convolutions of the helically wound tension spring 40 for retaining the upper end thereof in assembled relation with the retainer 44. In addition, the outwardly flanged end of a tube 50 is assembled between the retainer 44 and the seat 16, the tube 50 extending downwardly and constituting a shield for the upper end of the tension spring 40.

The lower spring seat 36 comprises an inverted cup-shaped member having a shoulder 52 against which the lower end of the spring 38 seats. A second tube 54 extends through the aperture in the seat 36 and is securely attached to the seat 36 by a flange coupling 56. The tube 54 is of smaller diameter than the tube 50 and is telescopically arranged within the tube 50. Accordingly, the tubes 54 and 50 constitute telescopically arranged shields for the tension spring 40. The lower end of the tension spring 40 is threaded in a helical groove 58 of a nut 60 of a screw jack. In addition, the lower end of the tension spring 40 is securely attached to the nut 60 by an external clamping ring 62. Rotation of the nut 60 is restrained by the tension spring 40. The nut 60 threadedly engages an Acme screw 64 which is coaxially arranged within the tube 54 and the tension spring 40. The lower end of the tube 54 is suitably attached to a gear reduction housing 66. The screw shaft 64 is journalled in the housing 66 by a radial roller bearing 68, a thrust roller bearing 70 and an end thrust ball 72. The lower end of the screw shaft 64 is keyed at 74 to a worm gear 76. The worm gear 76 meshes with a worm 78 that is drivingly connected with the flexible shaft 80.

The tension spring 40 is shown in the unloaded condition in FIGURE 2, at which time the compression spring 38 is fully expanded as shown in full lines in FIGURE 2. When the tension spring is fully loaded, the compression spring 40 will be compressed to the dotted line position depicted in FIGURE 2. As alluded to hereinbefore, the compression spring 38 has a constant spring rate as does the tension spring 40.

Referring again to FIGURE 1, a flexible shaft 80 is adapted to be rotated in opposite directions by a reversible electric motor 82 mounted on the differential housing 14. Energization of the actuator motor 82 is controlled by leveling switches 84 and 86 mounted in spaced relation on a bracket 88 suspended from the frame 10. An upstanding switch actuator 90 is attached to the axle 12. When the height between the frame 10 and the axle 12 is within the design range, the actuator 90 does not engage either switch 84 or switch 86. However, when the height between the frame 10 and the axle 12 is less than the design height, the actuator will operate switch 84 so as to energize the motor 82 for rotation in one direction. On the other hand, when the height between the frame 10 and the axle 12 is greater than the design height, the actuator 90 will operate the switch 86 to energize the motor 82 for rotation in the opposite direction.

Assuming that the vehicle is loaded, the height between the frame 10 and the axle 12 will decrease in proportion to the load. This will cause the actuator 90 to operate the switch 84 so as to energize the motor 82 for rotation in one direction. Under these conditions, the motor 82 will rotate the flexible shaft 80 to decrease the load on the tension springs 40 of both rear wheels. By decreasing the tension load, the compression springs 38 expand to maintain the design height between the frame 10 and the axle 12. Conversely, when the vehicle is unloaded the distance between the frame 10 and the axle 12 exceeds the design height whereby the actuator 90 will operate the switch 86 to energize the motor 82 for rotation in the opposite direction. Under these conditions, the flexible shaft 80 will rotate the screw shafts 64 so as to increase the load on the tension springs 40 thereby compressing the compression springs 38 to maintain the design height between the frame 10 and the axle 12.

While the embodiment of the invention as herein disclosed constitutes a preferred form, it is to be understood that other forms might be adopted.

What is claimed is as follows:

1. In a vehicle suspension, an unsprung mass, a sprung mass, a coil spring assembly disposed between the sprung and unsprung masses comprising coaxially arranged compression and tension springs, bearing supported rotatable means for adjusting the load on the tension spring to vary the load on said compression spring and thus control the height between said sprung and unsprung masses, and height responsive means for actuating the load adjusting means for the tension spring so as to maintain a substantially constant height between the sprung and unsprung masses of said vehicle.

2. A coil spring assembly for a vehicle suspension system including, a compression spring, a tension spring coaxially arranged with the compression spring, common spring seat means for one end of the compression spring and one end of the tension spring, a reciprocable nut attached to the other end of the tension spring, a screw shaft threadedly engaging said nut whereby rotation of said screw shaft will impart reciprocation to said nut and adjust the load on said tension spring, and means operable to rotate said screw shaft to vary the load on said compression spring.

3. The coil spring assembly set forth in claim 2 wherein said common spring seat means comprises an inverted cup-shaped member having an annular groove for receiving said one end of said compression spring and a centrally arranged aperture, a retainer secured to said cup-shaped member and extending through said aperture, said one end of said tension spring being securely attached to said retainer.

4. In a vehicle suspension, an unsprung mass, a sprung mass, a coil spring assembly disposed between the sprung and unsprung masses comprising coaxially arranged compression and tension springs, common spring seat means attached to one of said masses for one end of said compression spring and one end of said tension spring, bearing supported rotatable means for adjusting the load on said tension spring to vary the load on said compression spring and thus control the height between said sprung and unsprung masses, and height responsive means for actuating the load adjusting means for the tension spring so as to maintain a substantially constant height between the sprung and unsprung masses of said vehicle.

5. In a vehicle suspension, an unsprung mass, a sprung mass, a coil spring assembly disposed between the sprung and unsprung masses comprising a compression spring and a tension spring arranged coaxially within the compression spring, common spring seat means attached to one of said masses for one end of the compression spring and one end of the tension spring, electro-mechanical means for adjusting the load on said tension spring to vary the load on said compression spring and thus control the height between said sprung and unsprung masses including a bearing supported rotatable member, and height responsive means for actuating the load adjusting means for the tension spring so as to maintain a substantially constant height between the sprung and unsprung masses of said vehicle.

6. In a vehicle suspension, an axle, a frame, a coil spring assembly disposed between the frame and the axle comprising coaxially arranged compression and tension springs, common spring seat means attached to said frame for one end of the compression spring and one end of the tension spring, bearing supported rotatable means for adjusting the load on said tension spring to vary the load on said compression spring and thus control the height between said frame and said axle, and height responsive means for actuating the load adjusting means for the tension spring so as to maintain a substantially constant height between said frame and said axle.

7. The vehicle suspension set forth in claim 6 wherein the means for adjusting the load on the tension spring comprises a screw jack.

8. The vehicle suspension set forth in claim 6 wherein the means for adjusting the load on said tension spring comprises a screw jack and a reversible electric motor for operating said screw jack.

9. The vehicle suspension set forth in claim 8 wherein the height responsive means for actuating said electric motor comprises a pair of switches carried by said frame and a switch actuator carried by said axle.

10. A coil spring assembly for vehicle suspension systems including, a compression spring, a tension spring coaxially arranged with the compression spring, common spring seat means comprising an inverted cup-shaped member having an annular groove for receiving one end of said compression spring and a centrally arranged aperture, a retainer secured to said cup-shaped member and extending through said aperture, one end of said tension spring being securely attached to said retainer, a second inverted cup-shaped member constituting a seat for the other end of said compression spring, a tube attached to each cup-shaped member in spaced relation to said tension spring, said tubes being telescopically arranged so as to constitute a shield for said tension spring, a reciprocable nut attached to the other end of said tension spring, a screw shaft threadedly engaging said nut whereby rotation of said screw shaft will impart reciprocation to said nut and adjust the load on said tension spring, and means operable to rotate said screw shaft to vary the load on said compression spring.

11. In a vehicle suspension, an axle, a frame, a coil spring assembly disposed between the frame and the axle comprising coaxially arranged compression and tension springs, common spring seat means attached to said frame for one end of the compression spring and one end of the tension spring, means for adjusting the load on said tension spring to vary the load on said compression spring and thus control the height between said frame and said axle comprising a screw jack including a screw shaft and a nut in threaded engagement therewith, said nut being connected to the other end of said tension spring, a reversible electric motor for operating said screw jack and means including a flexible shaft drivingly interconnecting said screw shaft and said reversible electric motor, and means for actuating the load adjusting means for the tension spring so as to maintain a substantially constant height between said frame and said axle.

12. In a vehicle suspension, an axle, a frame, a coil spring assembly disposed between the frame and the axle comprising coaxially arranged compression and tension springs, common spring seat means attached to said frame for one end of the compression spring and one end of the tension spring, a spring seat for the other end of said compression spring, a control arm pivotally connected at one end to said frame and pivotally connected at the other end to said axle, the spring seat for the other end of said compression spring being attached to said control arm intermediate its ends, means for adjusting the load on said tension spring to vary the load on said compression spring and thus control the height between said frame and said axle, and means for actuating the load adjusting means for the tension spring so as to maintain a substantially constant height between said frame and said axle.

References Cited in the file of this patent
UNITED STATES PATENTS

| | | |
|---|---|---|
| 1,261,090 | Zisterer | Apr. 2, 1918 |
| 1,329,561 | Thompson | Feb. 3, 1920 |
| 2,427,927 | Schutte | Sept. 23, 1947 |
| 2,788,982 | Allison | Apr. 16, 1957 |

FOREIGN PATENTS

| | | |
|---|---|---|
| 698,110 | France | Nov. 17, 1930 |